(12) United States Patent
Kodama

(10) Patent No.: US 7,516,133 B2
(45) Date of Patent: Apr. 7, 2009

(54) METHOD AND APPARATUS FOR FILE REPLICATION WITH A COMMON FORMAT

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 10/688,329

(22) Filed: Oct. 17, 2003

(65) Prior Publication Data

US 2005/0086294 A1 Apr. 21, 2005

(51) Int. Cl.
*G06F 17/30* (2006.01)
(52) U.S. Cl. .......................................... 707/9; 711/147
(58) Field of Classification Search ........................ None
See application file for complete search history.

(56) References Cited

U.S. PATENT DOCUMENTS

| | | | |
|---|---|---|---|
| 5,592,618 A | 1/1997 | Micka et al. | |
| 6,389,459 B1 | 5/2002 | McDowell | |
| 6,594,675 B1 * | 7/2003 | Schneider | 707/200 |
| 6,615,312 B1 * | 9/2003 | Hamlin et al. | 711/112 |
| 6,636,908 B1 | 10/2003 | Winokur et al. | |
| 6,718,447 B2 * | 4/2004 | Cochran | 711/162 |
| 6,728,849 B2 | 4/2004 | Kodama | |
| 6,775,792 B2 * | 8/2004 | Ulrich et al. | 714/6 |
| 6,782,389 B1 * | 8/2004 | Chrin et al. | 707/10 |
| 6,782,401 B2 * | 8/2004 | Winokur | 707/201 |
| 6,804,700 B1 * | 10/2004 | Terek et al. | 709/203 |
| 7,203,731 B1 * | 4/2007 | Coates et al. | 709/214 |
| 7,237,037 B2 * | 6/2007 | Wells et al. | 709/246 |
| 2003/0126152 A1 * | 7/2003 | Rajak | 707/101 |
| 2004/0078419 A1 * | 4/2004 | Ferrari et al. | 709/201 |

OTHER PUBLICATIONS

"Availl for Replication," product information, Availl, Inc., 305 N. Main Street, Andover, MA 01810, available on-line from http://www.availl.com (2003).

"EMC Technote: Celerra Replicator," product information, EMC Corporation, 176 South Street, Hopkinton, MA 01748, available on-line from http://www.emc.com (2002).

"EMC Technote: OnCourse," product information, EMC Corporation, 176 South Street, Hopkinton, MA 01748, available on-line from http://www.emc.com (2002).

"SRDF with Celerra File Server," product technical information, EMC Corporation, 176 South Street, Hopkinton, MA 01748, available on-line from http://www.emc.com (2000).

"Network Appliance™ SnapMirror® Software," product information, Network Appliance, Inc., 495 East Java Drive Sunnyvale, CA 94089, available on-line from http://www.netapp.com (2002).

(Continued)

*Primary Examiner*—John R Cottingham
*Assistant Examiner*—Noosha Arjomandi
(74) *Attorney, Agent, or Firm*—Mattingly, Stanger, Malur & Brundidge, P.C.

(57) ABSTRACT

File requests sent to a file server that supports a proprietary file system are selectively performed on a second file system, in addition to being performed on the first file system. The second file system is not proprietary, but rather is designed around a publicly known format. Access to the second file system does not require obtaining permission from the vendor of the first file system; e.g., licensing, payment of royalties, and so on.

34 Claims, 12 Drawing Sheets

OTHER PUBLICATIONS

"Network Appliance™ SyncMirror™ Software," product information, Network Appliance, Inc., 495 East Java Drive Sunnyvale, CA 94089, available on-line from http://www.netapp.com (2002).

"TimeSring Protector," product information, TimeSpring Software Corporation, 2000 Peel St., Suite 905, Montreal, QC, Canada H3A 2W5, available on-line from http://www.timespring.com (2003).

* cited by examiner

| Read Only Bit | Yes |
| --- | --- |
| Archive Bit | No |
| Hidden File Bit | No |
| File Copy Bit | Yes |

METHOD AND APPARATUS FOR FILE REPLICATION WITH A COMMON FORMAT

BACKGROUND OF THE INVENTION

The present invention is related to computer file access and in particular to improving file access in a proprietary storage system.

Networked-based storage technology has become a common storage paradigm for enterprise storage needs. As an example, FIG. 1 shows a conventional network attached storage (NAS) system comprising a NAS gateway 0103 providing access to storage. In the example shown in FIG. 1, a storage area network (SAN) 0105 provides high capacity storage that is typically required by an enterprise.

The NAS gateway 0103 acts as a file server that is attached to one or more disk arrays (data stores) 0106, 0107 via the SAN 0105. Typically, clients access files (e.g., read, write) via the NAS gateway using a common protocol such as the network file system (NFS) protocol or the common internet file system (CIFS) protocol. Files are stored in a volume 0106*a* of a primary disk array 0106. A data structure, or format, of the file system in the volume of the primary disk array is generally proprietary in nature, and varies from one vendor of a NAS gateway to another. Thus, only the NAS gateway software for a particular vendor of the gateway understands the file system format. Vendor-specific, proprietary formats are usually the result of the vendor's effort to increase data I/O performance, provide enhanced functionality of the file system beyond conventional functions, and so on.

A common operation of a NAS gateway is data backup. Typically, data is dynamically backed up using any of a number of known replication techniques, such as mirroring. Thus, the file system contained in the first volume 0106*a* is replicated on a volume 0107*a* of a secondary disk array 0107. An example of a secondary disk array is ATA disk drive-based disk array. This type of storage is typically used for data backup, data archiving, and so on.

FIG. 1 also shows one or more clients 0101*a*, 0101*b* who access the NAS gateway 0103 via a suitable communication network 0102. The client communicates with the NAS gateway using an appropriate protocol, e.g., NFS, CIFS, to access files. The data access that occurs at the client level is conventionally referred to as file level access.

The communication network 0102 can be a local area network (LAN), or a wide area network (WAN). Connection to the network is known. For example, in a LAN, the underlying physical layer is typically an ethernet, and the protocol is TCP/IP.

The SAN 0105 connects together the NAS gateway 0103, the primary disk array 0106, and the secondary disk array 0107. This physical layer is typically a Fibre Channel. The communication protocol is typically fibre channel protocol (FCP). Another communication protocol is iSCSI over Ethernet.

The figure also shows that one or more application servers 0104 might require access to replication data contained in the secondary data store 0107. Many types of applications might access the replication data; e.g., data backup applications, data analysis applications, and so on. Since the file system contained in data store 0106 is a proprietary system, so too is the replication data contained in data store 0107. Consequently, the application server is not able to access the data in the data store 0107 directly over the SAN 0105. Instead, the application server must access the data via the NAS gateway 0103.

Replication data that is stored as archive data is a requirement in many business operations. For example, government regulations require certain data, such as data collected by financial institutions and other financial market enterprises, to be archived for many years. Email archives, medical patient records, and the like also typically require archival for great periods of time. However, since the replicated data is contained in a proprietary format file system, that archived data becomes inaccessible if the provider of the proprietary file server system is no longer in business, or otherwise no longer supports the proprietary file system.

Continuous file activity in the file system contained in the data store 0106 invariably results in fragmentation. Files comprise one or more blocks allocated from the storage medium. As files are created and deleted, blocks are allocated and returned to a pool of blocks. Therefore over time, a file is very likely to consist of non-contiguous blocks. The result is a reduce file access performance due to the need to move the read/write heads of the data storage systems randomly about the storage media to access blocks which comprise a file. File access performance in a primary data store such as data store 0106 may not be greatly affected because of the higher performance design of a primary data store. However, the data store 0107 typically used to contain the replication data is lower cost hardware. Lower cost disk drives typically are associated with lower performance access.

It is desirable therefore to improve access performance in a proprietary file system. It is desirable to provide improved performance while still providing for the replication/backup capability of conventional data storage systems.

SUMMARY OF THE INVENTION

A file server supports two file systems, one of which is a proprietary format, and the other is a publicly known format. Operations performed on the first file system in response to file requests; e.g., client-side file request, application originated file requests are performed on the first file system. In addition, such file requests are selectively performed on the second file system. A replication of files contained in the first file system therefore can be made on the second file system.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

Figure 2:
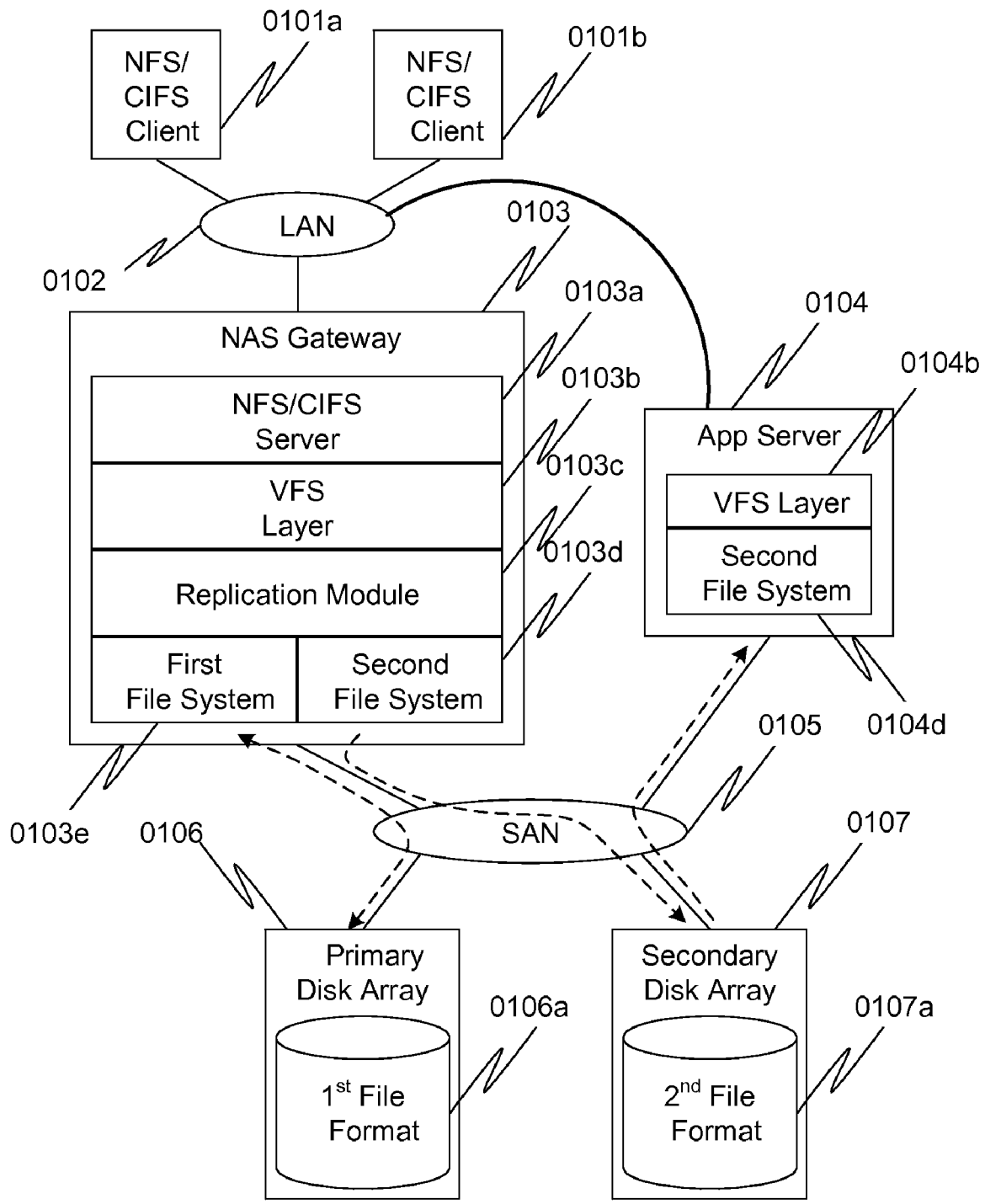
FIG. 2 is a generalized high level block diagram illustrating aspects of the present invention.

FIG. 2 shows a high level block diagram outlining the basic architecture of an example embodiment of a file server environment incorporating aspects of the present invention. A NAS gateway 0103 according to an embodiment of the present invention, is configured to support at least two file systems. A first file system 0103e a file system that is vendor-specific. Typically, this will be a file system that contains proprietary information as to format and other design features of the file system. For example, the proprietary features of the first file system (e.g., format, data organization, etc.) are likely to include optimizations made for the specific underlying physical storage to maximize access performance. Consequently, access to the first file system can only be made via the NAS gateway because it is configured with appropriate proprietary software that understands the format of the first file system. It is understood that such software is typically owned by a vendor (e.g., the vendor of the NAS gateway system). The vendor software and hence the file format, being proprietary, typically are not publicly available. If another vendor desired to use the first vendor's software, it would be expected that some form of permission (e.g., licensing, royalties, etc.) must first be obtained from the first vendor. Therefore, it can be appreciated that a client system can be configured with suitable software to access the first file system, provided that the vendor supplies the details of the first file system, such as file format and access protocols, and the like.

The NAS gateway 0103 shown in FIG. 2 further comprises a second file system 0103d that uses a publicly known format. The second file system is designed around a common format that is publicly known. The publicly known format of the second file system allows a vendor to develop suitable software in its systems (e.g., clients) to access files on the file system. It can be appreciated that the public nature of the format of the second file system allows programmers to create a library of system calls to access the second file system 0103d without having to license or otherwise arrange for permission from a vendor.

The NAS gateway 0103 shown in FIG. 2 comprises a suitable file server layer 0103a. For example, the layer can be an NFS (network file system) server, or a CIFS (common internet file system) server, or the like. The file server layer receives file requests from clients 0101a, 0101b over a suitable communication network 0102, such as a LAN. File requests received from clients by the file server layer are passed to a virtual file system (VFS) layer 0103b. The VFS layer provides a common set of APIs (Application Programming Interface) to the file server layer for file I/O operations. The VFS layer is a general layer in many operating systems and is used for providing applications with a uniform access to various file system implementations. Thus, a file request from a client is processed in the NAS gateway and appears as one or more corresponding file I/O requests from the VFS layer.

In accordance with this particular embodiment of the invention, the NAS gateway 0103 of FIG. 2, comprises a replication module 0103c. The replication module receives file I/O requests from the VFS layer 0103b. The replication module creates a replication of the files contained in the first (proprietary) file system 0103e and stores them in the second file system 0103d using a common, publicly known format. This aspect of the invention will be discussed in further detail below.

FIG. 2 shows a primary disk array 0106 and a secondary disk array 0107, which constitute a physical storage component of the file server. The primary disk array comprises a first volume 0106a that contains the files of the first file system 0103e. In accordance with the embodiment of the invention shown in the figure, a SAN 0105 provides access to the primary disk array and to the secondary disk array. The replication files produced by the replication module 0103c are contained in a second volume 0107a in the secondary disk array which contains the files of the second file system 0103e. The replication module accesses the secondary disk array via the SAN. It can be appreciated that in another embodiment, the second volume 0107a can be on the same disk array as the first volume 0106a.

FIG. 2 shows an application server 0104 configured according to this particular embodiment of the invention. The application server comprises a VFS layer 0104b that performs in the same manner as the VFS layer 0103b in the NAS gateway 0103 shown in FIG. 2. The application server further comprises a file system 0104d that supports the same format as the second file system 0103d of the NAS gateway. The application server is therefore capable of providing applications which run on the server and which can access the second file system 0103d that is contained in the secondary disk array 0107. More significantly, access to files contained in the second file system can be directly accessed by the application server and the client systems without having to make file requests to the NAS gateway 0103 shown in FIG. 2.

One of ordinary skill will appreciate that the foregoing components can be provided in a suitable computing environment. For example, the NAS gateway 0103 shown in FIG. 2 typically comprises one or more CPUs (central processor unit) and software which runs on the CPU(s). The various components of the NAS gateway can be implemented in software, firmware, and logic circuits such as ASICs (application specific integrated circuits). The implementation details are readily accessible to one of ordinary skill and therefore do not require additional discussion.

Figure 3:
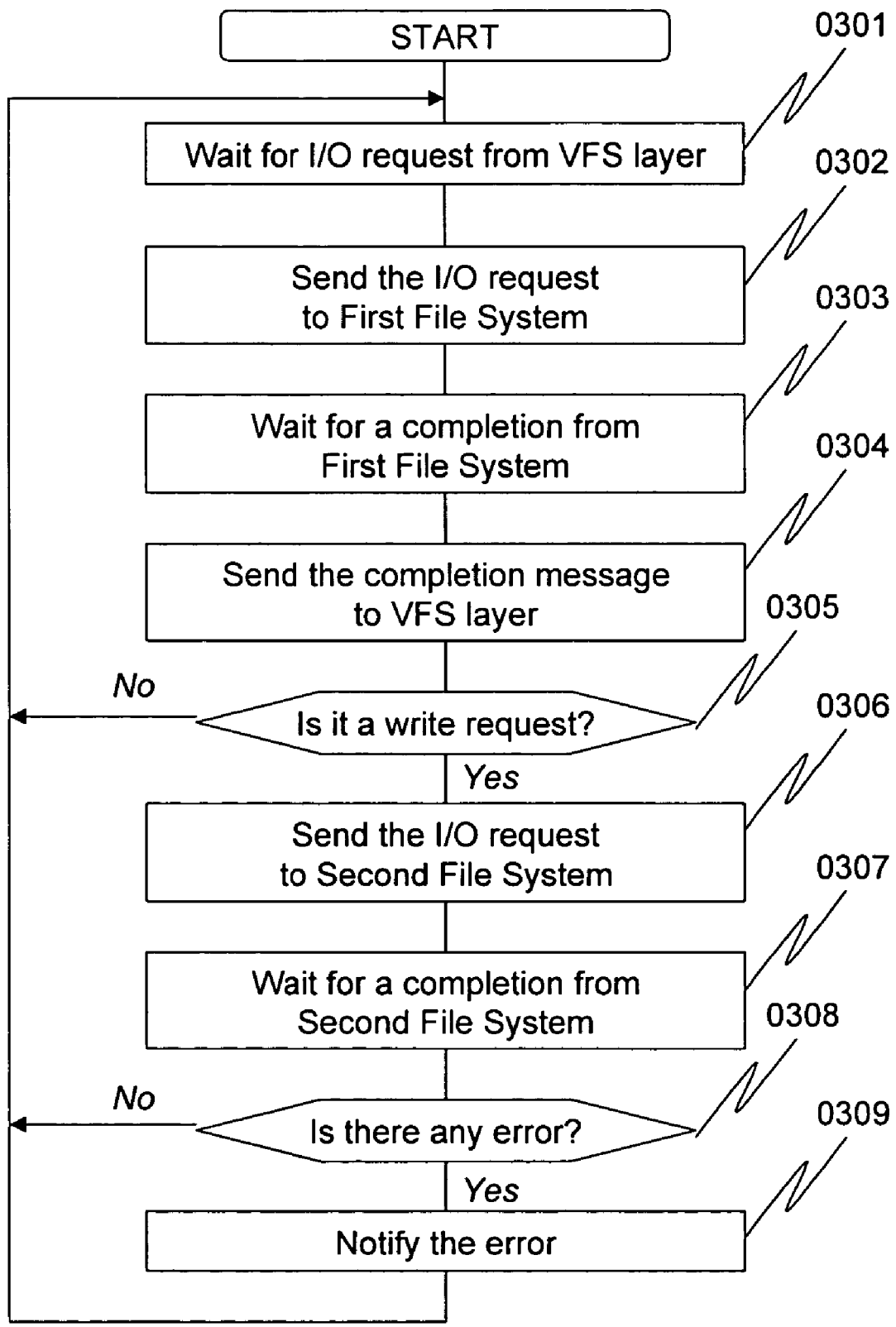
FIG. 3 is a high level flow chart, illustrating the highlights of storage processing in accordance with an aspect of the present invention.

The discussion will now turn to a discussion of illustrative embodiments of various aspects of the invention. Referring, then, to FIG. 3, operation of an I/O handling process in the replication module 0103c shown in FIG. 2 in accordance with an embodiment of the present invention is discussed. This embodiment of the I/O handling process in the replication module operates in a "synchronous replication" mode.

Thus, in a step 0301, the I/O handling process runs in an idle loop, waiting for file I/O requests from the VFS layer 0103b. When a file I/O request is received from the VFS layer, the I/O handling process will make the necessary file system calls to perform one or more operations on the first file system 0103e on the primary disk array 0106 (step 0302) to service the file I/O request. The I/O handling process then waits, in a step 0303, for a suitable response from the primary disk array that indicates completion of the requested operation(s). Then, in a step 0304, the I/O handling process sends a suitable completion message to the VFS layer.

Next, in a determination step 0305, the I/O handling process determines if the file I/O request from the VFS layer 0103b is a write-type operation; i.e., an operation which changes or otherwise results in a change of one or more of the attributes associated with the file(s) that are the target of the file I/O request. For example, modification to a file, deletion of a file, creation of a file, changing file attributes, modification of a directory attribute, creation of a directory, deletion of a directory, and so on are typical write-type operations. If the operation was not a write-type operation, then the I/O handling process returns to the idle loop of step 0301.

If the operation is a write-type operation, then the I/O handling process sends a request to the second file system 0103d, step 0306. The I/O handling process performs this by making appropriate file system calls to the secondary disk array 0107 to perform one or more operations on the second file system. The I/O handling process waits for a response indicative of completion of the requested operation(s) on the second file system (step 0307). If the NAS gateway detects an I/O error in the first file system, the NAS gateway can notify the requestor of the occurrence of the error; no operation is performed for the second file system.

If an error is detected in a step 0308, then the I/O handling process makes note of the error in a step 0309. The particulars of noting an error depends on the protocol for handling errors that is defined for the second (common) file system. For example, the NAS gateway can return a suitable error message to the requestor, the error can be logged in the NAS gateway in a log file, or the error can be reported to an administrator via email, and the like. The I/O handling process then returns to the idle loop of step 0301.

If no error was detected when accessing the secondary disk array 0107, then the I/O handling process simply returns to the idle loop of step 0301.

Figure 4:
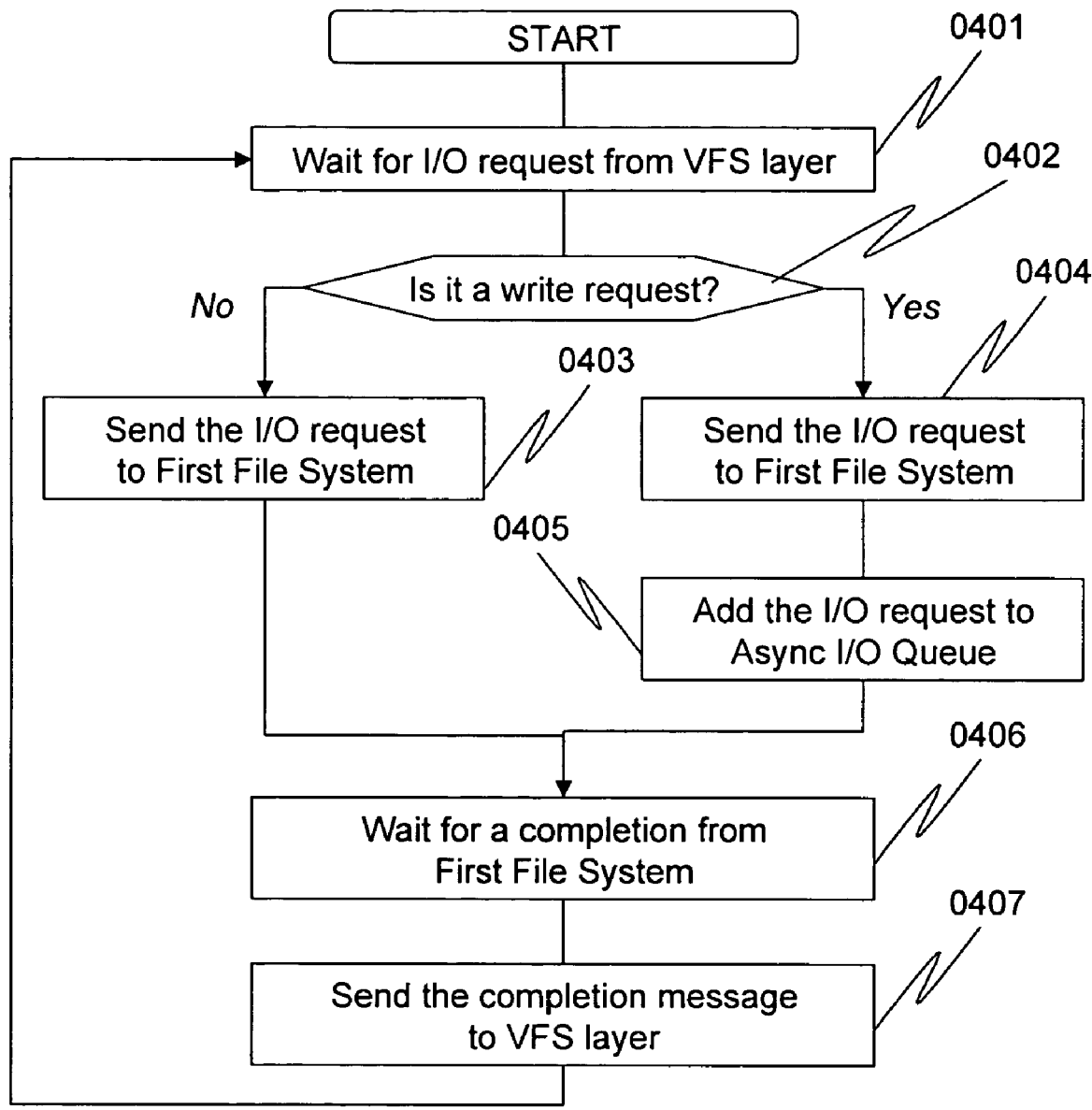
FIG. 4 shows the highlights of processing in a virtual file system in accordance with an aspect of the invention.

Refer now to FIG. 4 for a discussion of operation of the I/O handling process in the replication module 0103c of FIG. 2 in accordance with another embodiment of this aspect of the invention. This embodiment of the I/O handling process operates in an "asynchronous replication" mode.

Thus, in a step 0401, the I/O handling process runs in an idle loop, waiting for a file I/O request form the VFS layer 0103b. When a request is received, the I/O handling process determines in a step 0402 whether the file I/O request from the VFS layer is a write-type operation. If it is not a write-type operation, then the I/O handling process performs the requested operation on the first file system 0103e, step 0403. This step involves making appropriate file system calls to access the first file system. Processing then continues with step 0406.

If the file I/O request from the VFS layer is a write-type operation, then the I/O handling process performs the requested operation on the first file system, step 0404, just like in step 0403. The I/O handling process then adds the file I/O request, in a step 0405, to an Async I/O queue; an illustrative example is discussed in connection with FIG. 10 below. Processing then continues with step 0406.

The I/O handling process waits for a response from the first file system, step 0406, that indicates completion of the requested operation. The I/O handling process then sends a suitable completion message to the VFS layer in a step 0407, and returns to the idle loop of step 0401.

Figure 5:
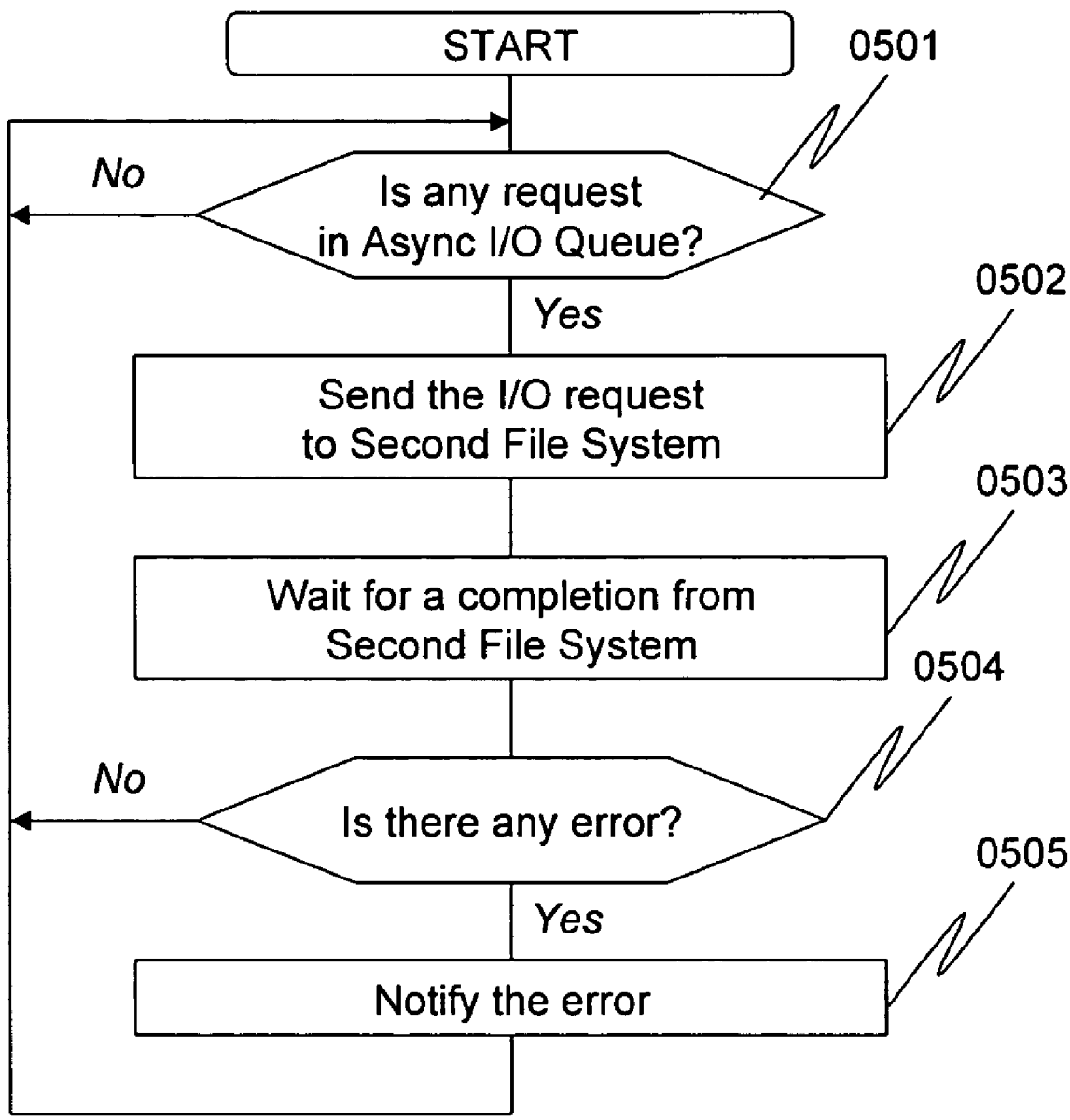
FIG. 5 highlights of processing steps in an asynchronous queue.

Referring now to FIG. 5, operation of a replication process in the replication module 0103c shown in FIG. 2 in accordance with this embodiment of the invention will be described. The replication process runs in an idle loop in a step 0501. When the I/O handling process puts a file I/O request into the Async I/O queue, the replication process begins its task. When a request is detected in the queue, the replication process, in a step 0502, will make appropriate file system calls to access the second file system 0103d to effect the file I/O request that was placed in the queue. The replication process waits for a suitable completion message to be returned, in a step 0503. If an error is detected in an error detection step 0504, then the replication process notes the error (step 0505) in the manner discussed above. The replication process then returns to step 0501 and waits for another request to be queued up in the Async I/O queue. If no error was detected, then the replication process simply returns to step 0501 and waits for a request to be queued up in the Async I/O queue.

Figure 10:
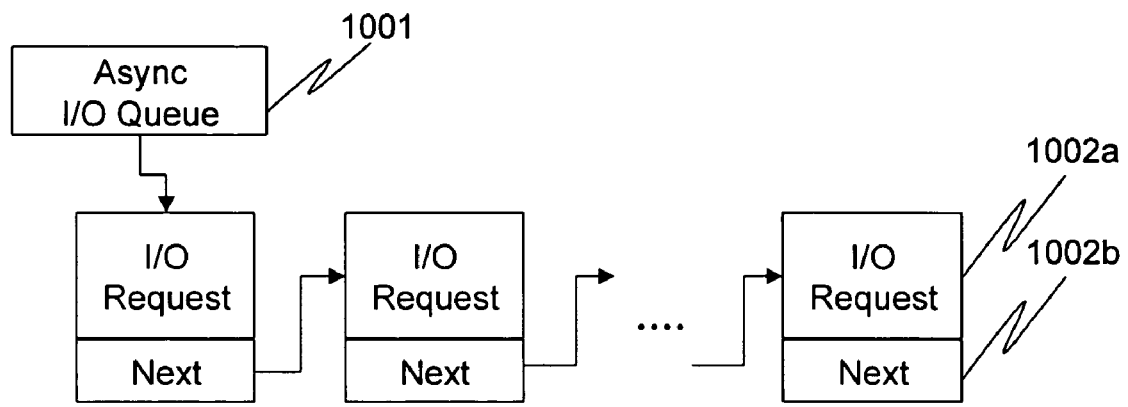
FIG. 10 shows a typical implementation of an asynchronous queue according to an embodiment of the present invention.

Referring for a moment to FIG. 10, an illustrative example of the Async I/O queue is described. The queue shown in FIG. 10 includes a queue header 1001. There is a pointer to the list of queue entries. Each queue entry comprises an I/O request portion 1002a and a next pointer portion 1002b. The specific format of the I/O request portion is dependent on implementation details of the file I/O request format from the VFS layer 0103b. The next pointer portion simply points to the next entry in the queue.

Referring to FIGS. 6-9, another embodiment of the present invention is discussed. According to this embodiment of the invention, a file is replicated to the secondary disk array when updating operations on the file has completed. The NAS gateway 0103 can be made aware of this occurrence by virtue of receiving a file close request from an NFS/CIFS client 0101a that supports a file close request. For example, NFS v4 supports a file close request. The file close request is handled by the VFS layer 0103b and the replication module 0103c. As will be explained, the replication module includes three processes: a process for file access I/O; a sequential allocation process for replication of the accessed file; and a process for handling file copy requests.

Figures 8, 9:
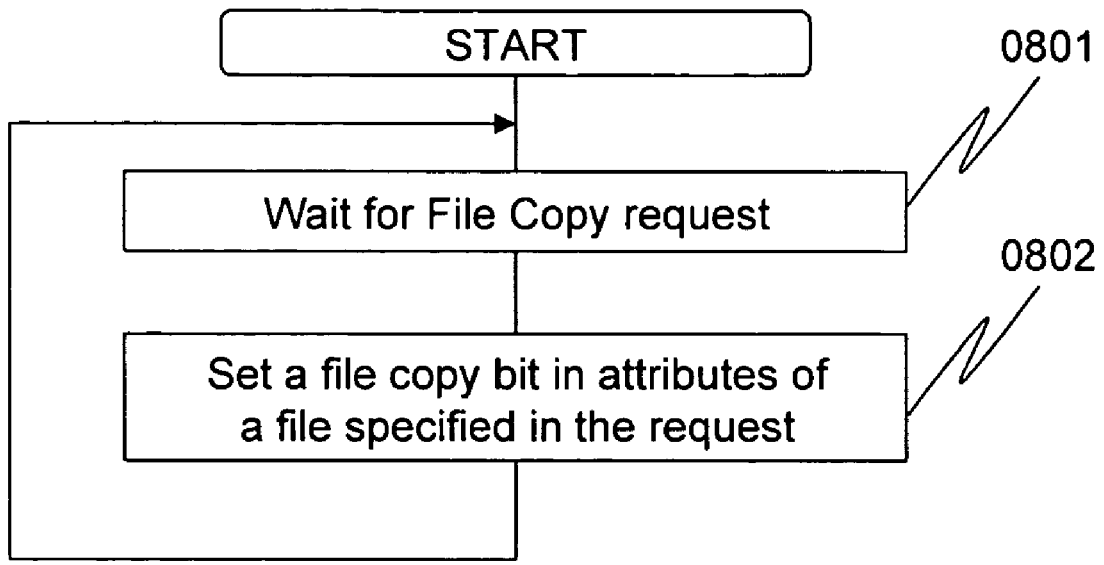
FIG. 8 illustrates file copy handling.
FIG. 9 shows an implementation example of an attribute file.

In accordance with this embodiment of the invention, each file is associated with an attribute bit called a "file copy" bit. Conventionally, files have a set of attributes associated with them. For example, FIG. 9 shows a table 0901 listing some typical attributes, such as read only, archive, hidden file, and so on. The specific attributes depend on the particular file system that is implemented. The table in FIG. 9 also includes the attribute "file copy" 0901a, in accordance with this embodiment of the invention. Its use will be discussed below in connection with FIG. 6.

Figure 1:
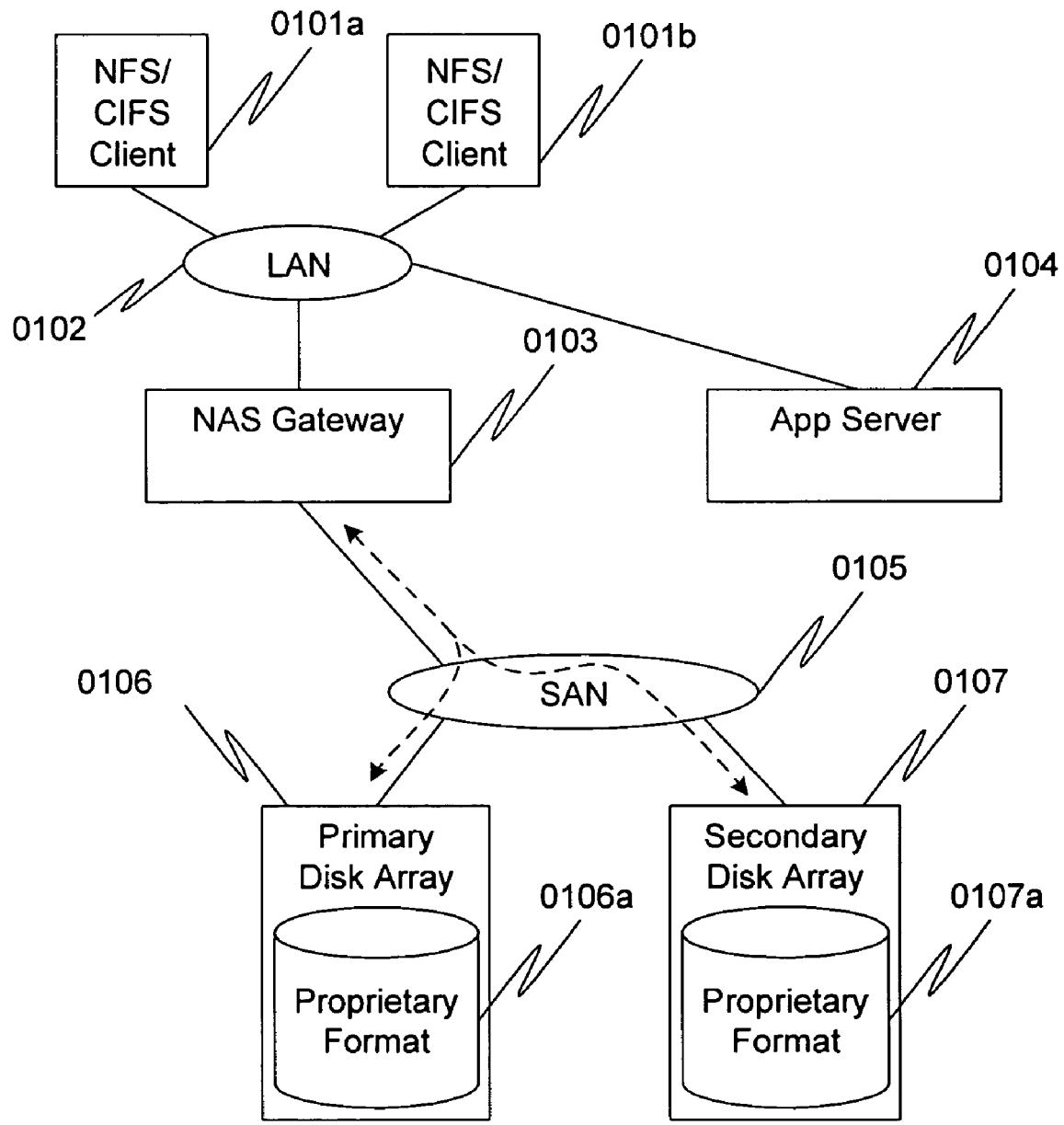
FIG. 1 shows a typical arrangement for a conventional storage system.
Figure 6:
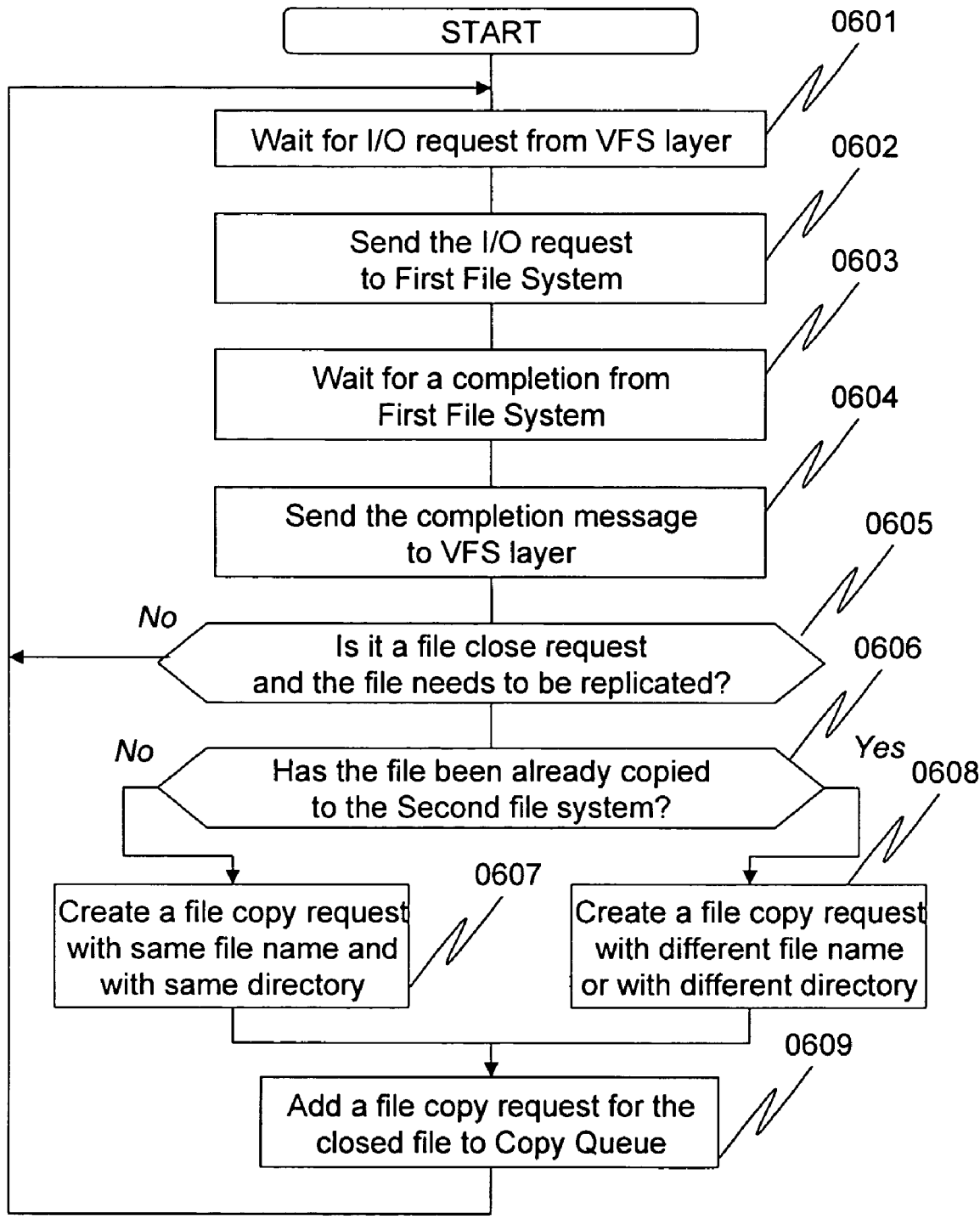
FIG. 6 highlights the steps for sequential allocation processing.

FIG. 6 highlights the steps in an I/O process in the replication module to process file access I/O requests in accordance with this embodiment of the invention. In a step 0601, the I/O process executes in a wait state, waiting for a file I/O request from the VFS layer 0103b (FIG. 1). In a step 0602, when the I/O process receives a file access request, it makes a similar request to the first (proprietary) file system 0103e to effect the requested operation. The I/O process then waits for a completion response from the first file system, step 0603. A completion message is then communicated to the VFS layer in a step 0604.

In a determination step 0605, the I/O process determines if the file I/O request was a file close request. The I/O process consults a table similar to the table 0901 of FIG. 9 that is associated with the accessed file. The associated "file copy" bit is examined. If the file request was file close operation and its associated "file copy" bit is set, then the I/O process proceeds to a step 0606. If not, then the process simple re-enters the wait state of step 0601. As will become clear shortly, the "file copy" bit can be used to control whether multiple copies of an accessed file will be stored on the volume 0107a which contains the second file system 0103d.

In step 0606, a determination is made whether the accessed file has already been copied to the volume 0107a of the second (common format) file system. If the accessed file has not been previously copied to the second file system, then in a step 0607, a file copy request is created to produce a copy of the accessed file to be stored in the second file system. The file copy request will include the same directory name and same file name as the accessed file.

If, in step 0606, it is determined that the accessed file has been previously copied, then in a step 0608, a file copy request is created to produce a copy of the accessed file. The copy request will include a new directory name and/or a new file name. In this way, the second file system can maintain multiple copies (versions) of the accessed file. The multiple copies can be organized in different directories, or by different file names, or by using some other suitable convention. This can be accomplished by specifying an appropriate directory and/or file name in the copy request. For example, a version number can be appended to the directory name, or to the file name. Alternatively, a file that has been previously copied to the second file system can be simply overwritten by a subsequent copy of the file. Whether versioning is used or not is a policy decision that is made by the administrator of the storage facility.

Figure 11:
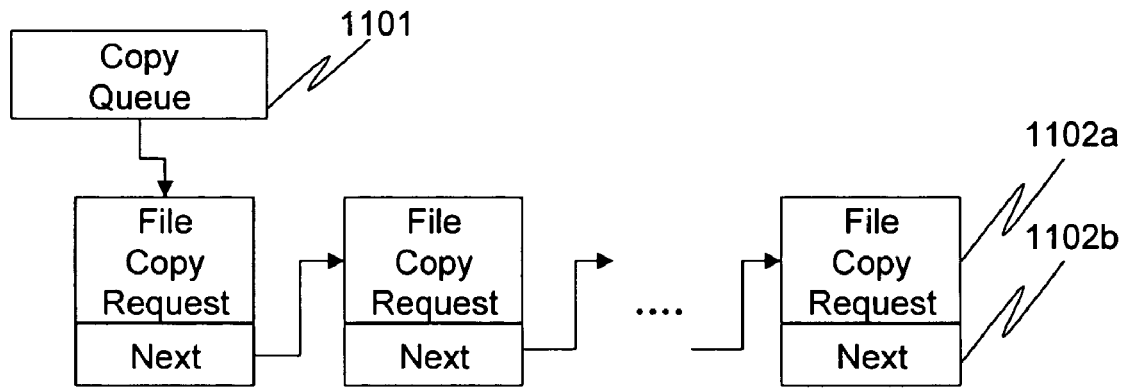
FIG. 11 shows a typical implementation of a copy queue of copy requests in accordance with an embodiment of the present invention.
Figure 12:
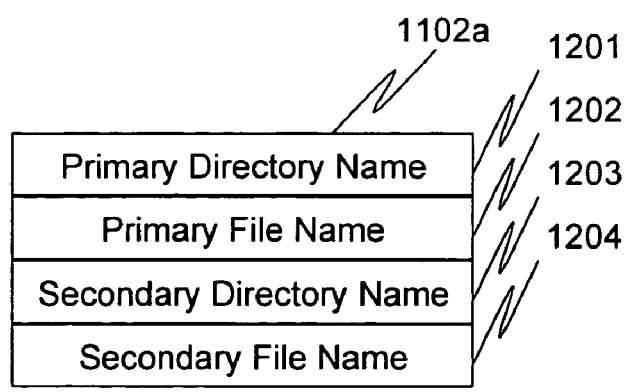
FIG. 12 shows a typical data structure for a copy request of FIG. 11.

In a step 0609, a suitable file copy request (whether created in step 0607 or in step 0608) is then queued up on a copy queue. FIGS. 11 and 12 discussed below show an example of a copy queue in accordance with this embodiment of the invention. The I/O process then re-enters the wait state of step 0601.

Referring for a moment to FIGS. 11 and 12, an example of a copy queue is shown in FIG. 11. A queue pointer 1101 points to a queue of copy requests. Each copy request comprises a body 1102a and a next pointer 1102b to the next copy request.

FIG. 12 shows an example of a copy request body 1102a. In the particular implementation shown, a copy request comprises four fields: A primary directory name field 1201 stores the pathname of the directory in the first file system 0103e under which the accessed file is located. A primary file name field 1202 stores the name of the accessed file as it exists in the first file system. A secondary directory name field 1203 stores the pathname of the directory in the second file system 0103d in which a copy of the accessed file stored. A secondary file name field 1204 stores the file name of the copy.

Figure 7:
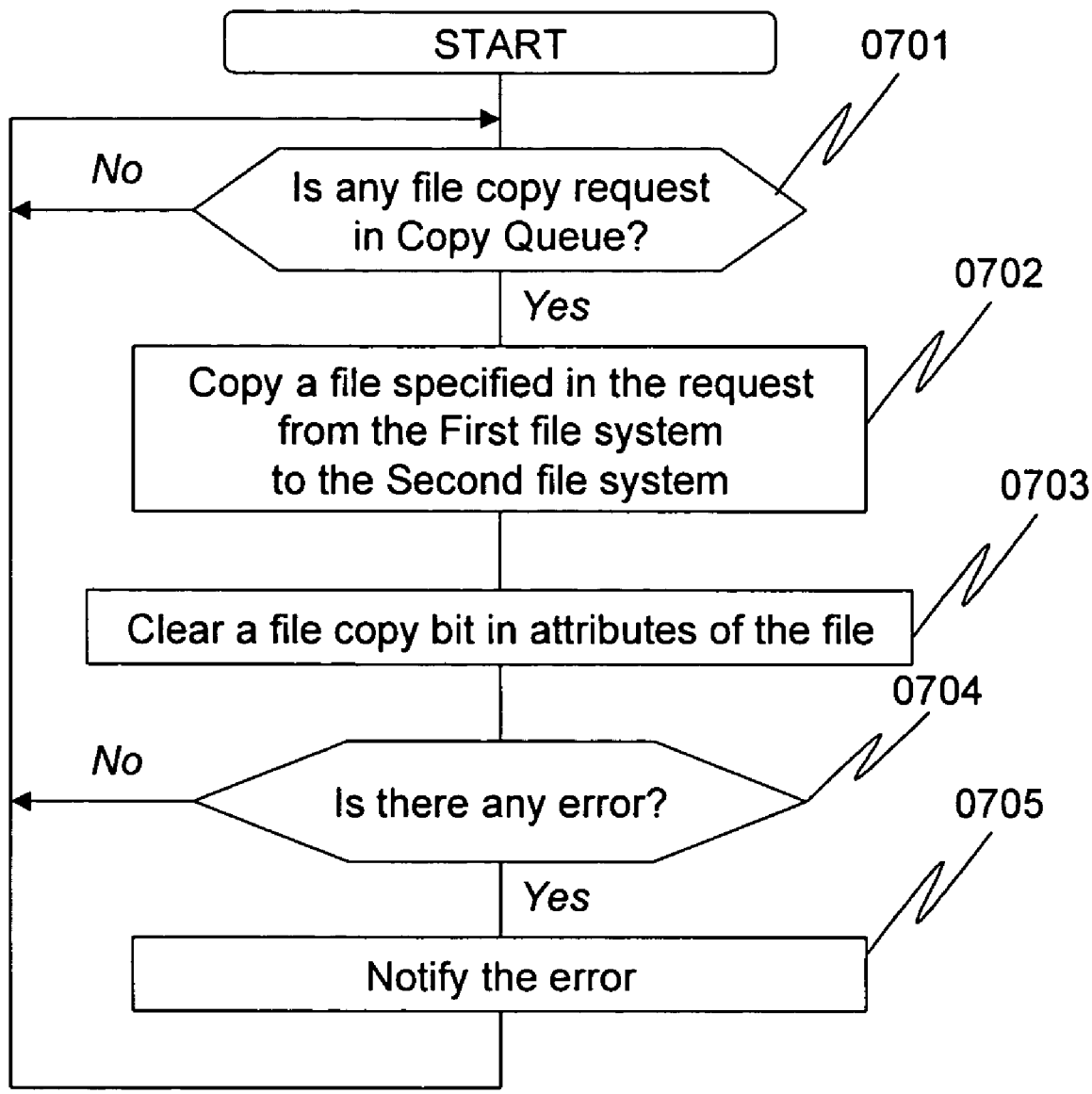
FIG. 7 illustrates a sequential allocation aspect of the invention.

FIG. 7 highlights processing in a sequential allocation process in the replication module 0103c. This process copies files from the first file system 0103e to the second file system 0103d. In a step, 0701, the process checks the file copy queue (e.g., queue 1101) for file copy requests. A step 0702 is performed when a file copy request is queued up. The process accesses the file specified in the primary directory name field 1201 and the primary file name field 1202 of the file copy request. A copy of the file is then made in the second file system 0103d. The secondary directory name field 1203 and the secondary file name field 1204 are used to locate the copied file in the second file system. In a step 0703, the "file copy" bit associated with the accessed file is cleared.

In a step 0704, a determination is made whether the operation in the second file system successfully completed or not. If the operation was not successful, a suitable notification is made in a step 0705; for example, as discussed above. The process then returns to checking the file copy queue of step 0701.

It can be appreciated that in an embodiment of the invention where the second file system merely accumulates files, there would be no deletion of files. It can be expected, then, that the disk blocks allocated to each file are in block-sequential order. Consequently, there is no fragmentation of disk blocks in the secondary disk array, and so file accessed from the volume 0107a will tend to be faster than from the typically fragmented volume of an active file system that is subject to file deletion and file creation activity. The reason is that a file whose blocks were allocated sequentially requires no head seek during reading back of the file. Thus, the physical storage devices used to hold the second file system can be lower cost (and consequently, slower access) devices as compared to the physical storage used to hold the first file system, and still provide adequate performance by storing files in sequential blocks and thus avoid time consuming head seeks during file access. Thus, an embodiment of this aspect of the invention, is a second file system whose files comprise sequentially allocated blocks.

FIG. 8 highlights the process by which the "file copy" attribute can be set. If there were many updates to a file in the primary disk array 0106, this could result in large numbers of copies of the file in the secondary disk array 0107. By setting the "file copy" bit for some or all of the files in the first file system only periodically, the number of copies that are maintained in the secondary disk array can be kept to a reasonable number. The policies for setting the "file copy" bit can be determined by a system administrator, and is very much specific to the policies and particulars of a given enterprise.

In a step 0801, a process in the replication module 0103c waits for a bit-setting request. The request can be implemented in many ways. For example, a command line interface or graphical interface can be provided which allows a user to specify the files whose corresponding "file copy" bits are to be set (or cleared). A web page can be provided for remote access. A machine interface can be provided, allowing for an automated setting of "file copy" bits. In a step 0802, when the process receives a bit-setting request, the "file copy" bits for the indicated files are set. It can be appreciated that previously set bits can be cleared. This allows for full flexibility in managing whether, when, and the frequency with which files in the first file system are copied to the second file system. Processing then returns to step 0801 after the "file check" bits have been set or cleared.

Figure 13:
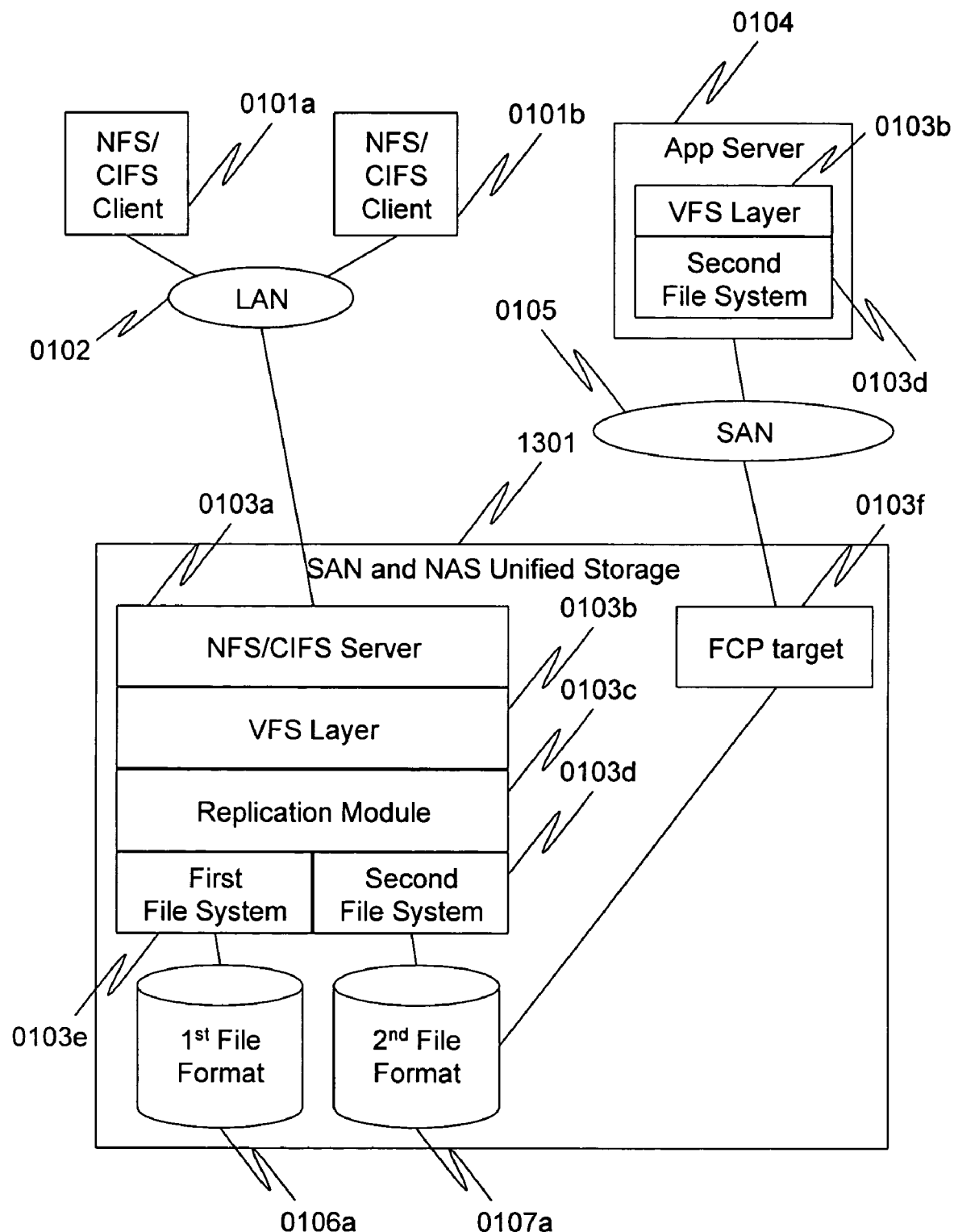
FIG. 13 illustrates an alternate embodiment of the present invention.

FIG. 13 shows yet another embodiment of the present invention. The configuration shown in the figure incorporates a NAS gateway component 0103 into a storage system 1301. This configuration is referred to as a SAN & NAS unified storage architecture because both NAS services and SAN services are supported.

The NAS gateway component 0103 shown in FIG. 13 is the same as the gateway shown in FIG. 2. Clients 0101a, 0101b communicate with the gateway over a suitable communication medium, such as the LAN 0102. The gateway provides storage in a first (proprietary) file system 0103e that is stored in a primary volume 0106a. A second file system 0103d is maintained in a secondary volume 0107a.

The second file system 0103d uses a publicly known format. The second file system is designed around a common format that is publicly known. The publicly known format of the second file system allows a vendor to develop suitable software in its systems (e.g., clients) to access files on the file system. It can be appreciated that the public nature of the format of the second file system allows programmers to create a library of system calls to access the second file system 0103d without having to license or otherwise arrange for permission from a vendor.

The NAS gateway 0103 shown in FIG. 13 comprises a suitable file server layer 0103a. For example, the layer can be an NFS (network file system) server, or a CIFS (common internet file system) server, or the like. The file server layer receives file requests from clients 0101a, 0101b over a suitable communication network 0102, such as a LAN. File requests received from clients by the file server layer are passed to a virtual file system (VFS) layer 0103b. The VFS layer provides a common set of APIs (Application Programming Interface) to the file server layer for file I/O operations. The VFS layer is a general layer in many operating systems and is used for providing applications with a uniform access to various file system implementations. Thus, a file request from a client is processed in the NAS gateway and appears as one or more corresponding file I/O requests from the VFS layer.

In accordance with this particular embodiment of the invention, the NAS gateway 0103 of FIG. 13, comprises a replication module 0103c. The replication module receives file I/O requests from the VFS layer 0103b. The replication module creates a replication of the files contained in the first (proprietary) file system 0103e and stores them in the second file system 0103d using a common, publicly known format. This aspect of the invention will be discussed in further detail below.

FIG. 13 shows a fiber channel protocol (FCP) target 0103f provided in the storage system 1301. The FCP target serves as an interface to provide SAN services over a SAN 0105. As shown in the figure, the FCP target provides access to the second volume 0107a. An application server 0104 can therefore access the second volume over a SAN 0105 via the FCP target. In accordance with the invention, the NAS gateway provides access to its own (proprietary) file system 0103e (stored in disk 0106), while making suitable copies to the second file system 0103d (stored in disk 0107) which stores files in a common publicly known file system format. Thus, if the NAS gateway becomes unavailable (e.g., due to obsolescence, or the manufacture is no longer in business), access to the files can still be retrieved from the second file system.

Figure 14:
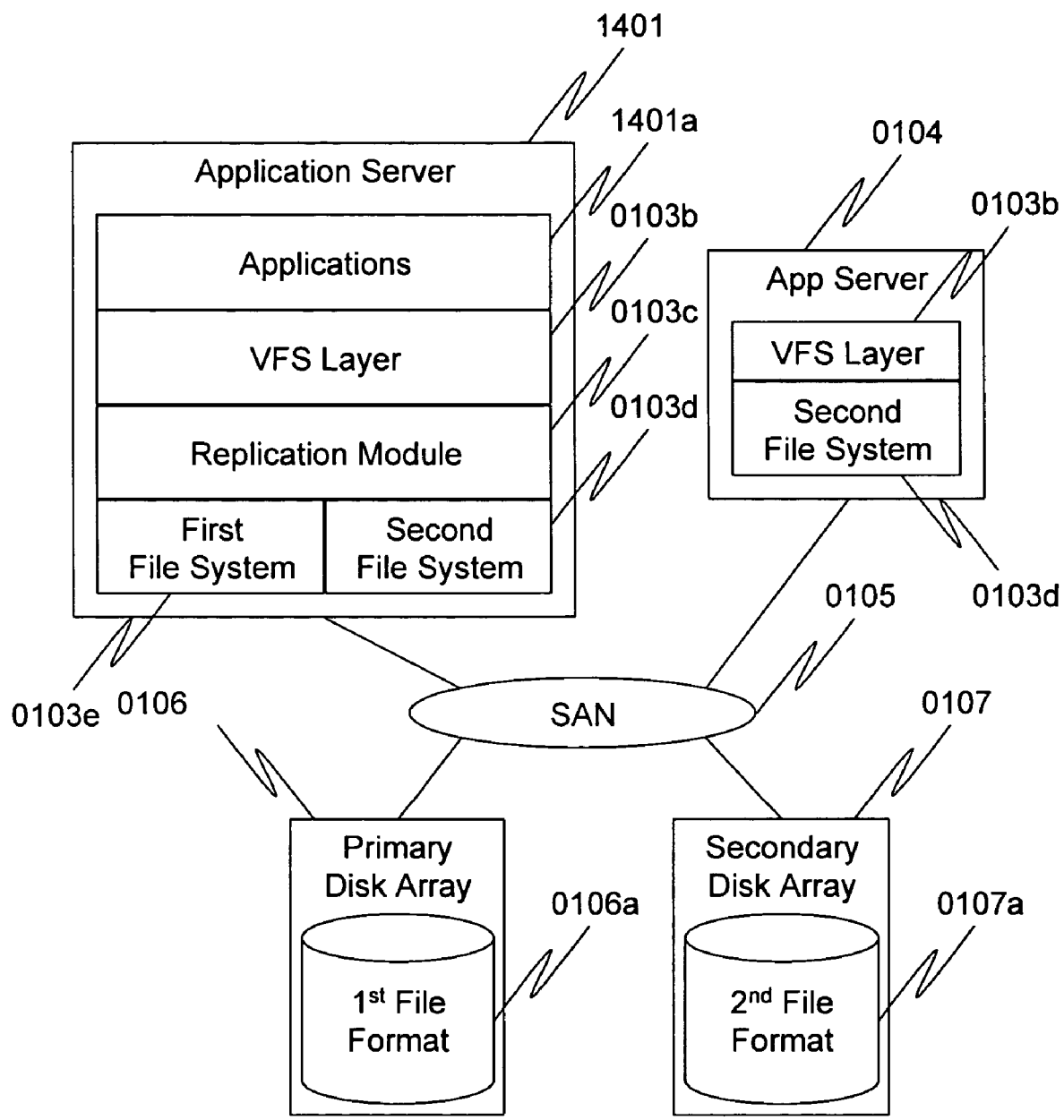
FIG. 14 illustrates yet another embodiment of the present invention.

FIG. 14 shows still another embodiment of the invention. A SAN 0105 provides access to a primary disk array 0106 and a secondary disk array 0107. A first application server 1401 includes one or more applications 1401a running on the server. The first application server also includes a file system component comprising a VFS layer 0103b, a replication module 0103c, and first and second file systems 0103e and 0103d respectively.

The first file system 0103e can be a proprietary file system. The VFS layer 0103b and replication module 0103c perform as described above. Files are replicated on the secondary disk array 0107 and supports the second file system using a common publicly known format.

FIG. 14 also shows a second application server 0104. The second application server comprises a VFS layer component 0104b and supports a file system 0104d that is the same format as the second file system 0103d. The second application 0104 can therefore access the secondary disk array 0107 and the files stored therein.

Figure 15:
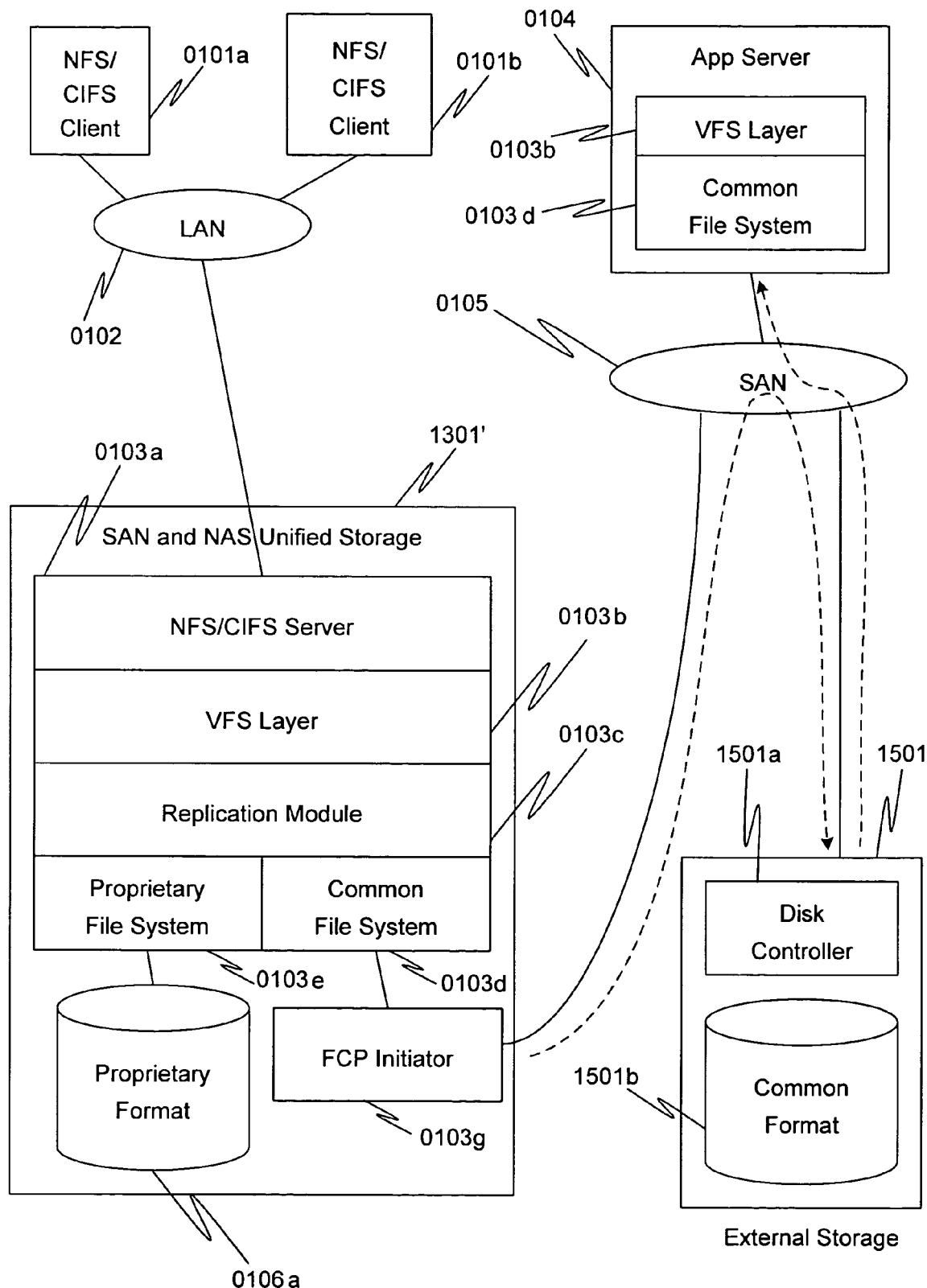
FIG. 15 illustrates another embodiment of the present invention.

FIG. 15 shows yet another illustrative embodiment of the invention. A SAN/NAS unified storage architecture 1301', similar to the architecture shown in FIG. 13. The NAS gateway component 0103 shown in FIG. 15 is the same as the NAS gateway component shown in FIG. 2. Clients 0101a, 0101b communicate with the gateway over a suitable communication medium, such as the LAN 0102. The gateway provides storage in a first (proprietary) file system 0103e that is stored in a primary disk array 0106a.

The NAS gateway component 0103 shown in FIG. 15 is the same as the gateway shown in FIG. 2. Clients 0101a, 0101b communicate with the gateway over a suitable communication medium, such as the LAN 0102. The gateway provides storage in a first (proprietary) file system 0103e that is stored in a primary disk array 0106a. A second file system 0103d is maintained in an external storage system 1501.

The second file system 0103d uses a publicly known format. The second file system is designed around a common format that is publicly known. The publicly known format of the second file system allows a vendor to develop suitable software in its systems (e.g., clients) to access files on the file system. It can be appreciated that the public nature of the format of the second file system allows programmers to create a library of system calls to access the second file system 0103d without having to license or otherwise arrange for permission from a vendor.

The NAS gateway 0103 shown in FIG. 15 comprises a suitable file server layer 0103a. For example, the layer can be an NFS (network file system) server, or a CIFS (common internet file system) server, or the like. The file server layer receives file requests from clients 0101a, 0101b over a suitable communication network 0102, such as a LAN. File requests received from clients by the file server layer 0103a are passed to a virtual file system (VFS) layer 0103b. The VFS layer provides a common set of APIs (Application Programming Interface) to the file server layer for file I/O operations. The VFS layer is a general layer in many operating systems and is used for providing applications with a uniform access to various file system implementations. Thus, a file request from a client is processed in the NAS gateway and appears as one or more corresponding file I/O requests from the VFS layer.

In accordance with this particular embodiment of the invention, the NAS gateway 0103 of FIG. 15, comprises a replication module 0103c. The replication module receives file I/O requests from the VFS layer 0103b. The replication module creates a replication of the files contained in the first (proprietary) file system 0103e and stores them in the second file system 0103d using a common, publicly known format. This aspect of the invention will be discussed in further detail below.

A fiber channel protocol (FCP) initiator 0103g is provided in the storage system 1301'. The FCP initiator serves as an interface to a SAN 0105 and provides access to SAN services. When the FCP initiator receives a write request from the second (common) file system 0103d, it will interact with the SAN to issue a corresponding write command to the external storage system 1501. A disk controller component 1501a in the external storage system will perform the write operation of the data to the storage 1501b on which the common file system resides.

An application server 0104 can be configured with a VFS layer 0103b and the second file system 0103d as in the storage system 1301'. In this way, the application server 0104 can access the data that is contained in the external storage 1501 without having to make an access through the SAN and NAS Unified Storage 1301'.

What is claimed is:

1. A method for accessing files in a file server comprising:
receiving a file request in connection with a file;
performing one or more first operations on a first file system in response to the file request, wherein the one or more first file operations are performed on a copy of the file contained in the first file system;
creating a copy of the file on the second file system having a filename the same as the file when the file has not been copied to a second file system different from the first file system, and creating a copy of the file on the second file system having a filename different from the file when the file has been copied to the second file system;

selectively performing one or more second operations on the second file system in response to the file request when the file request includes a write-type operation on the file and is queued up in a list of operations to be performed on the second file system, wherein the list of operations comprise operations from previous file requests, wherein the one or more first operations are performed asynchronously with respect to the one or more second operations, and wherein the one or more second operations are performed on the copy of the file contained in the second file system; and accessing files on the first file system by a first client system only via file server and accessing files on the second file system directly by a second client system via a block interface absent of the file server, wherein a format of the first file system is different from a format of the second file system.

2. The method of claim 1 wherein each file contained in the second file system comprises sequentially allocated blocks.

3. The method of claim 1 wherein each file contained in the second file system comprises one or more blocks of physical storage allocated in sequential order.

4. The method of claim 1 wherein the step of performing one or more second operations is performed only after completing the step of performing one or more first operations.

5. The method of claim 1 wherein the step of performing one or more second operations is performed if the file request is a file close operation.

6. The method of claim 1 wherein a file copy bit for each file in the said first file system on whether copy was created on the second file system is kept and is used to determine whether the file has been copied to the second file system or not.

7. A method for accessing files on a file server comprising:
receiving a request for a first operation on a file, the request including a file reference;
performing the first operation on a first file in a first file system, the first file being identified by the file reference;
storing information representative of the first operation and of the file reference in an entry of a queue;
creating a copy of the file on the second file system having a filename the same as the file when the file has not been copied to a second file system different from the first file system, and creating a copy of the file on the second file system having a filename different from the file when the file has been copied to the second file system; and
selectively performing one or more second operations on the second file system in response to the file request when the file request includes a write-type operation on the file and is queued up in a list of operations to be performed on the second file system, wherein the list of operations comprise operations from previous file requests, wherein the one or more first operations are performed asynchronously with respect to the one or more second operations, and wherein the one or more second operations are performed on the copy of the file contained in the second file system; and
accessing files on the first file system by a first client system only via the file server and accessing files on the second file system directly by a second client system via a block interface absent of the file server, wherein a format of the first file system is different from a format of the second file system.

8. The method of claim 7 wherein the second operation is performed if the operation represented by the information in the entry is a write-type operation.

9. The method of claim 8 wherein the second operation that is performed is the same as the first operation.

10. The method of claim 7 wherein the second operation is a copy operation to produce the second file by making a copy of the first file, if the operation represented by the information in the entry is a file close operation.

11. The method of claim 10 wherein the copy operation produces multiple versions of the first file, in the second file system.

12. The method of claim 11 wherein files in the second file system comprise sequentially allocated blocks of a physical storage medium.

13. A method for operating a file server comprising:
receiving a file request;
communicating one or more first file operations to a first file system to perform the file request on a file in the first file system, the file being identified in the file request;
creating a copy of the file on the second file system having a filename the same as the file when the file has not been copied to a second file system different from the first file system, and creating a copy of the file on the second file system having a filename different from the file when the file has been copied to the second file system;
determining if the file request is a write-type of request, when a determination is made that the file request is a write-type of request, communicating one or more second file operations to the second file system to perform the file request on a file in the second file system after the file request on the first file system has completed; and
accessing files on the first file system by a first client system only via the file server and accessing files on the second file system directly by a second client system via a block interface absent of the file server, wherein a format of the first file system is different from a format of the second file system and wherein the one or more first file operations are performed asynchronously with respect to the one or more second file operations.

14. The method of claim 13 wherein the format of the first file system is not a publicly known format and the format of the second file system is a publicly known format.

15. A method for accessing files in a file server comprising:
providing a first file system and a second file system, the second file system comprising files contained in the first file system, the first file system having a file system format that is different from a file system format of the second file system;
receiving a file request;
performing one or more first operations on a file stored in the first file system;
creating a copy of the file having the same filename as the file when the file has not been copied to the second file system when the file request is a close file operation, and creating a copy of the file having a different filename from the file when the file has been copied to the second file system, the copy being stored in the second file system, and
accessing files on the first file system by a first client system only via the file server and accessing files on the second file system directly by a second client system via a block interface absent of the file server, wherein the one or more first file operations are performed asynchronously with respect to the one or more second file operations.

16. The method of claim 15 wherein if a previous copy of the file in the first file system is stored in the second file system, then the step of producing a copy includes preserving the previous copy, whereby multiple copies of the file in the first file system are accumulated in the second file system.

17. The method of claim 15 wherein the file system format of the first file system is not a publicly known format and the file system format of the second file system is a publicly known format.

18. A file server comprising:
a data processing component;
a communication component configured to receive file requests; and
a physical storage component in data communication with the data processing component comprising a first physical storage portion and a second physical storage portion, wherein the first physical storage portion containing files organized in a first file system, and the second physical storage portion containing files organized in a second file system, the first file system having a format different from the second file system, wherein the second file system comprises one or more files contained in the first file system, the data processing component comprising first file system software for accessing the first file system and second file system software for accessing the second file system,
performing first file requests in connection with a file made on the first file system,
creating a copy of the file on a second file system having a filename the same as the file when the file has not been copied to the second file system different from the first file system, and creating a copy of the file on the second file system having a filename different from the file when the file has been copied to the second file system different from the first file system, and configured to performing at least some of the first file requests on the second file system; and
accessing files on the first file system by a first client system only via the file server and accessing files on the second file system directly by a second client system via a block interface absent of the file server, wherein a format of the first file system is different from a format of the second file system and wherein the one or more first file operations are performed asynchronously with respect to the one or more second filed operations.

19. The file server of claim 18 wherein files stored in the second file system include multiple versions of one or more files stored in the first file system.

20. The file server of claim 19 wherein each file stored in the second file system comprises blocks of a physical storage device that are sequential in allocation order.

21. The file server of claim 18 wherein the first file system is not a publicly known format and the second file system is a publicly known format.

22. The file server of claim 18 wherein file requests performed on the second file system are write-type file requests.

23. A network attached storage (NAS) gateway configured in accordance with the file server of claim 18.

24. The NAS gateway of claim 23 further comprising a storage area network (SAN), the physical storage component comprising a portion of the SAN, the NAS gateway configured to communicate over the SAN to access the physical storage component.

25. The NAS gateway of claim 23 further comprising an interface to the second file system configured for communication with a SAN, wherein access to the second file system can be made via the SAN.

26. The NAS gateway of claim 23 further comprising an interface configured for communication with a SAN, wherein some of the first file requests performed on the second file system are made via the SAN.

27. The NAS gateway of claim 26 wherein an application server can access the second file system via the SAN.

28. An application server comprising:
a data processing component for executing one or more applications;
file access software configured to access a first file system and a second file system that is different from the first file system;
a physical storage component comprising first physical storage for files contained in the first file system, the physical storage component further comprising second physical storage for files contained in the second file system;
wherein the file access software receives file requests in connection with a file from the one or more applications and performs the file requests on the first file system and selectively performs the file requests on the second file system, and creates a copy of the file on the second file system having a filename the same as the file when the file has not been copied to a second file system different from the first file system, and creating a copy of the file on the second file system having a filename different from the file when the file has been copied to the second file system and
wherein a first client system accesses files on the first file system only via the file server and a second client system accesses files on the second file system directly via a block interface absent of the file server, wherein a format of the first file system is different from a format of the second file system and wherein one or more first file operations on the first file system are performed asynchronously with respect to one or more second file operations on the second file system.

29. The server of claim 28 wherein the physical storage component is provided via a SAN.

30. The server of claim 28 wherein the file requests are performed on the second file system for write-type file requests.

31. The server of claim 28 wherein the write-type file requests include a modification to a file, a deletion of a file, creation of a file, changing one or more file attributes, modification of one or more directory attributes, creation of a directory, and deletion of a directory.

32. file server comprising:
means for receiving file requests;
means for performing the file requests on a first file system, including means for communicating with the first file system; and
means for selectively performing the file requests on a second file system, including means for communicating with the second file system, the second file system having a format different from the first file system,
means for creating a copy of the file on the second file system having a filename the same as the file wherein when a file associated with a first file request on the first file system has not been copied to the second file system;
means for creating a copy of the file on the second file system having a filename different from the file when the file has been copied to the second file system; and
means for accessing files on the first file system by a first client system only via the file server and accessing files on the second file system directly by a second client system via a block interface absent of the file server, wherein one or more first file operations on the first file system are performed asynchronously with respect to one or more second file operations on the second file system.

33. The file server of claim 32 wherein the means for selectively performing the file requests includes performing the file requests that are write-type file requests.

34. An application server comprising data processing means for execution one or more applications, the applications producing one or more file requests; and file server means according to claim 32 for performing file requests received from the one or more applications.

* * * * *